United States

Davie

[54] METHOD OF PREPARING ANTIFOULANT COATING COMPOSITIONS AND RESULTING PRODUCT

[72] Inventor: William R. Davie, Hopewell Township, Beaver County, Pa.

[73] Assignee: Porter Paint Co.

[22] Filed: Oct. 14, 1968

[21] Appl. No.: 767,483

Related U.S. Application Data

[63] Continuation-in-part of Ser. No. 574,943, Aug. 25, 1966, abandoned.

[52] U.S. Cl. .....................260/28, 106/15 FP, 260/33.2 EP, 260/33.6 EP, 260/37 EP
[51] Int. Cl. ....................................C08g 51/52, C08f 45/28
[58] Field of Search.................................260/28; 106/15 AF

[56] References Cited

UNITED STATES PATENTS 2,765,288  10/1956  Whittier et al............................260/28
3,214,279  10/1965  Scott...................................106/15 AF Primary Examiner—Morris Liebman
Assistant Examiner—Samuel L. Fox
Attorney—Cushman, Darby & Cushman

[5] 3,676,388

[5] July 11, 1972

[57] ABSTRACT

An antifoulant coating composition and preparation method in which the final composition is composed of two Components "A" and "B" mixed immediately before the composition is applied, and usually an inert filler introduced at least in part via Component "A". The active ingredient of Component "A" is a base formed of coal-tar pitch or equivalent and epoxy resin. The active ingredients of Component "B" are a curing agent for the epoxy resin and a solid organotin toxicant. Component "B" may be either a slurry of needle-like crystals of toxicant, or the toxicant may be dissolved in a suitable solvent. In the latter case the toxicant precipitates as needle-like crystals when Components "A" and "B" are mixed. The invention produces a composition of a viscosity which makes it easy to apply.

14 Claims, No Drawings

METHOD OF PREPARING ANTIFOULANT COATING COMPOSITIONS AND RESULTING PRODUCT

This application is a continuation-in-part of my earlier application Ser. No. 574,943, filed Aug. 25, 1966 (now abandoned).

The invention relates to improved methods of preparing antifoulant coating compositions and to the resulting products.

One known form of antifouling coating composition includes an organotin toxicant and a base formed of an aromatic tar-epoxy resin combination. Such compositions possess superior properties, both for preserving a metal substrate against corrosion and for inhibiting growth of marine organisms. The composition is prepared by mixing two Components "A" and "B" immediately before the composition is applied to the substrate. Heretofore Component "A" has contained both the toxicant and the base. Component "B" has been a curing agent for the epoxy resin contained in the base, commonly an aliphatic polyamine. When the toxicant is a trialkyltin carboxylate, such as tributyltin acetate, Component "A" is extremely viscous, and it is difficult to mix the two components. The composition remains viscous after mixing, and is difficult to apply to a substrate. If the composition is thinned with sufficient solvent to make it easy to apply, the coating has poor sag resistance and also is less effective against marine organisms.

An object of my invention is to provide an improved method of preparing a coating composition of the foregoing type to produce a composition which is less viscous and hence easier to apply to a substrate.

A further object is to provide an improved method of preparing a coating composition of the foregoing type to produce a composition which can be applied as a coating of a wet film thickness up to about 30 mils without sagging.

A more specific object is to provide an improved preparation method in which I incorporate the toxicant in Component "B" along with the curing agent, and include only the base as the active ingredient of Component "A", whereby the final composition formed by mixing the two components is much less viscous and is easily applied with a brush, roller or spray device, but retains the full effectiveness against both corrosion and marine organisms.

A further object is to provide an improved antifoulant coating composition which results from practice of the method.

A further object is to provide novel Component "B" formulations, useful for mixing with an epoxy-containing base to produce antifoulant coating compositions, said formulations consisting of an organotin toxicant, a nitrogen-containing curing agent for the epoxy resin of the base, and a diluent which may be a solvent for the toxicant.

According to my invention, I make up a Component "A", the active ingredient of which is a base of an epoxy resin and an aromatic pitch-containing material or equivalent in widely variable proportions. At the extremes the base may contain as much as 95 parts by weight of one to as little as 5 parts of the other, but I prefer to include the two in approximately equal quantities. The pitch-containing material preferably is coal tar pitch, but I can use coal tar itself, which of course includes pitch, or I can use other aromatic pitches, such as those of petroleum origin. I can also use synthetic thermoplastic hydrocarbon resins from the classes polyindene, coumarone-indene, terpene phenolic, styrene acrylonitrile indene terpolymer, and low molecular weight polystyrenes. The epoxy resin may be any of those commonly used in such compositions having a 1,2 epoxy equivalency greater than 1 and usually about 2, such as the reaction products of polyhydric alcohols or polyhydric phenols with epichlorhydrin or glycerol chlorhydrin. Component "A" may also contain about 15 to 20 percent of a solvent, and an inert filler in an amount to produce a filler content in the mixed composition up to about 50 percent by weight. Examples of suitable solvents are xylene, a high boiling aromatic solvent fraction, or ethylene glycol monoalkyl ether. Examples of suitable fillers are talc, clay, silica flour or iron oxide.

I make up a Component "B", the active ingredients of which are an organotin toxicant, a nitrogen-containing curing agent for epoxy resin, and usually a diluent. Component "B" may be either a slurry of toxicant crystals or a solution, and it contains about 1 to 10 parts by weight of toxicant for each part by weight of curing agent. To these I may add diluent in an amount such that Component "B" contains up to about equal parts by weight of diluent and toxicant. Component "B" may also contain inert filler similar to those used in Component "A".

As a toxicant, I use mainly a solid trialkyltin carboxylate of the general formula:

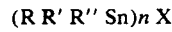

$$(R\ R'\ R''\ Sn)_n\ X$$

in which R, R' and R'' are alkyl groups of one to eight carbon atoms, X is a carboxylate group, either monocarboxylate or dicarboxylate, and $n$ is 1 or 2 respectively. My preferred toxicant is tributyltin acetate. Alkyl groups of fewer than four carbon atoms (methyl, ethyl and propyl) are effective, but are more volatile and more toxic to mammals, which makes their use more hazardous. Using alkyl groups of more than four carbon atoms dilutes the effectiveness and increases the cost. Since the toxic activity is due to the tin content, the longer groups become successively more impractical. I may also use mixed trialkyltin compounds, such as dibutylpropyltin carboxylate, as long as they are solids, but they tend to be less crystalline and to dissolve more completely. I can use any monocarboxylate group from formates through octanoates, or a dicarboxylate group such as oxalic, succinic, glutaric, adipic, azaleic, phthalic, tetrahydrophthalic, or methyl endomethylene tetrahydropthalic. Similar considerations govern the choice of carboxylate group as govern the choice of alkyl group, since longer chain carboxylates cost more per unit weight and must be used in larger quantities.

The curing agent is a nitrogen-containing compound of the group consisting of polyamines and polyamides. My preferred curing agent is diethylene triamine. Other examples of suitable polyamines are triethylene tetramine, N,N dibutyl-1-3-propane diamine, ethylene diamine, or tetraethylene pentamine. Another useful curing agent is that which results from reacting phenol, formaldehyde and a polyamine, as disclosed in British Pat. No. 886,767. Acceptably cured compositions may result with this curing agent in a range of 12 to 85 parts per 100 parts of a typical epoxy resin. A wide concentration range of toxicants can be prepared in this curing agent in conjunction with various diluents. Examples of suitable polyamides are those available commercially under the trademark "Versamid" which are condensation products of polymerized linoleic acid with polyamines.

According to one embodiment of my invention, Component "B" is in the form of a slurry in which there are undissolved needle-like crystals of toxicant. Both the curing agent and the diluent dissolve the toxicant to some extent, but in this embodiment I prefer a diluent in which the toxicant is only sparingly soluble, such as secondary and tertiary alcohols. Nevertheless I can use others, such as methanol, toluene or xylene, in which the toxicant is quite soluble, but I use these in smaller proportions. I may also use various combinations of these diluents. When the slurry form of Component "B" is stored for a prolonged period, the toxicant crystals tend to grow. The larger crystals reduce the effectiveness of the coating, produce a rough surface, and may clog the nozzles of spray equipment. I overcome this difficulty by warming the component in which crystal growth has occurred and thereby melting the crystals. On normal cooling, the toxicant recrystallizes as small crystals.

According to a second and preferred embodiment of my invention, the toxicant is taken fully into solution in Component "B". I use a diluent in which the toxicant is readily soluble, preferably primary lower alcohols or aliphatic or cycloaliphatic hydrocarbons. Nevertheless I can use others, such as pyridine, trichloroethylene, o-dichlorobenzene. I may also use various combinations of these solvents. The second embodiment of my invention altogether avoids the problem of crystal growth and hence is preferred.

I mix Components "A" and "B" immediately before applying the composition to a substrate. On a filler-free and solvent-free basis, the resulting composition consists of about 60 to 90 percent by weight of cured base and about 40 to 10 percent by weight of toxicant, or preferably about 75 percent cured base and 25 percent toxicant. With less than 10 percent toxicant, the antifoulant life is short. With more than 40 percent toxicant, the composition becomes uneconomical, and the coating loses strength and durability. The mixed composition before application to a substrate may contain up to about 50 percent by weight filler, which I may add all via Component "A" or in part via Component "B" and the remainder via Component "A". The composition is of a low viscosity that enables it to be applied to a substrate readily with a brush, roller or spray. The composition is thixotropic, and single coats up to about 30 mils wet film thickness can be applied without sagging. Preferably I first apply to the substrate a primer coating of aromatic tar-epoxy resin plus curing agent without the toxicant; only the exposed outer coating of 4 to 20 mils dry film thickness need contain toxicant.

After the coating is applied, it is critical that at least a portion of the toxicant remains in the form of needle-like crystals of an appearance resembling asbestos, and that the crystals be uniformly dispersed through the outer coating. If Component "B" is in slurry form, only a portion of the toxicant goes into solution and the remaining crystals act as seed crystals, whereby the dissolved toxicant forms similar crystals and/or enlarges the seed crystals as it precipitates on mixing of the components. If Component "B" is in solution form, the solvent must be one which does not retain the toxicant in solution in the presence of Component "A" (e.g. methanol). As the components mix, the toxicant precipitates and forms the same needle-like crystals.

To produce a composition suitable for spraying in cold weather, I may add a small amount of thinner to the mixture of Components "A" and "B" to adjust its viscosity. The thinner must be a liquid which has a low solvency power for the toxicant. Examples of suitable liquids for this purpose are propylene glycol monomethyl ether, dioxane, isopropyl alcohol, secondary butyl alcohol, tertiary butyl alcohol, methyl isobutyl ketone, diisobutyl ketone, and diisobutyl carbinol. The thinner may be added in proportions of approximately 15 percent by volume of the total mixture.

EXAMPLE I

As a specific example of the first embodiment of my method, I made up 90 grams of Component "A" containing 25 percent each of coal tar pitch and epoxy resin, about 30 percent talc filler, and 20 percent xylene solvent. I made up 13.6 grams of Component "B" by warming together at 60 C the following materials: 2.4 grams diethylene triamine, 0.6 grams toluene and 0.6 grams n-butanol, and 10 grams tributyltin acetate. When this mixture cooled to room temperature, it became solid, but by stirring I easily broke it down to a free flowing slurry of fine needle-like crystals. I mixed the foregoing quantities of Components "A" and "B" and obtained a composition which is easily brushed, rolled or sprayed onto a surface. A steel test panel bearing a 10 mil coating (dry film thickness) of this composition over a coal tar-epoxy primer coating showed substantially no fouling after 6 months exposure to sea water at Miami Beach, Fla.

EXAMPLE II

I prepared the following mixtures to serve as Component "A" of my composition in which all quantities are in parts by weight:

| | | Parts |
|---|---|---|
| (a) | Coal tar pitch | 27 |
| | Epoxy resin ("(Epon 834")") | 33 |
| | Talc | 20 |
| | Coal tar distillate (boiling range about 150–210C) | 20 |
| (b) | Coal tar pitch | 14 |
| | Epoxy resin ("(Epon 834")") | 14 |
| | Silica flour | 52 |
| | Coal tar distillate (boiling range about 150–210C) | 20 |

In each instance I melted the pitch, then added the solvent, epoxy resin and filler.

I prepared the following mixtures to serve as the slurry form of Component "B" of my composition:

| | | Parts |
|---|---|---|
| (c) | Tributyltin acetate | 70 |
| | Diethylene triamine | 15 |
| | Methanol | 15 |
| (d) | Tributyltin acetate | 75 |
| | Diethylene triamine | 16 |
| | Toluene | 4.5 |
| | n-Butanol | 4.5 |
| (e) | Tributyltin acetate | 58 |
| | Diethylene triamine | 13 |
| | Secondary butyl alcohol | 29 |
| (f) | Tributyltin acetate | 66 |
| | Diethylene triamine | 7 |
| | Methanol | 27 |
| (g) | Tributyltin acetate | 40 |
| | Amine curing agent as taught in British Patent 886,767, prepared from phenol (1 mole), diethylene triamine (3 moles) and formaldehyde (3 moles) | 40 |
| | Secondary butyl alcohol | 20 |
| (h) | Tributyltin acetate | 46 |
| | Amine curing agent as taught in British Patent 886,767, prepared from phenol (1 mole), diethylene triamine (3 moles) and formaldehyde (3 moles) | 21 |
| | Secondary butyl alcohol | 33 |
| (i) | Tributyltin acetate | 40 |
| | Polyamide curing agent ("Versamid 140") | 40 |
| | Secondary butyl alcohol | 20 |
| (j) | Tributyltin propionate | 75 |
| | Diethylene triamine | 16 |
| | Toluene | 4.5 |
| | n-Butanol | 4.5 |
| (k) | Tributyltin butyrate | 75 |
| | Diethylene triamine | 16 |
| | Toluene | 4.5 |
| | n-Butanol | 4.5 |
| (l) | Bis (tributyltin) phthalate | 75 |
| | Diethylene triamine | 16 |
| | Secondary butyl alcohol | 9 |
| (m) | Bis (tributyltin) succinate | 75 |
| | Diethylene triamine | 16 |
| | Toluene | 4.5 |
| | n-Butanol | 4.5 |

In each instance I heated the ingredients together to about 60° C to dissolve the toxicant, cooled the mixture to crystallize the toxicant, and stirred it to produce a flowable slurry. I then combined the different "A" and "B" components according to the following table:

| Component A | Component B |
|---|---|
| 90 parts from Ex. II (a) | 14.4 parts from Ex. II (c) |
| 90 parts from Ex. II (b) | 15 parts from Ex. II (f) |
| 90 parts from Ex. II (a) | 13.4 parts from Ex. II (d) |
| 90 parts from Ex. II (a) | 17.2 parts from Ex. II (e) |
| 80 parts from Ex. II (a) | 25 parts from Ex. II (g) |
| 85 parts from Ex. II (a) | 21.5 parts from Ex. II (h) |
| 90 parts from Ex. II (a) | 13.4 parts from Ex. II (j) |
| 90 parts from Ex. II (a) | 13.4 parts from Ex. II (k) |
| 90 parts from Ex. II (a) | 13.4 parts from Ex. II (l) |
| 90 parts from Ex. II (a) | 13.4 parts from Ex. II (m) |
| 85 parts from Ex. II (b) | 22.5 parts from Ex. II (f) |

Each composition was of a brushable consistency and produced a well-cured coating film. In each instance the cured composition contained between 10 and 40 percent toxicant on a filler-free basis.

EXAMPLE III

To produce a composition which I could apply by spraying in cold weather, I prepared a composition which consisted of the following:

90 parts Component "A" from Example II (a)
13 parts Component "B" from Example II (d)
10 parts diisobutyl ketone The last-named ingredient thinned the composition without appreciably dissolving the toxicant.

EXAMPLE IV

As a specific example of the second embodiment of my method, I prepared Component "A" by combining 30 parts of coal-tar pitch with 30 parts epoxy resin, 20 parts filler, and 20 parts solvent. I made up Component "B" by mixing 15 parts tributyltin acetate, 2,4 parts of diethylene triamine, and 15 parts of methanol. I mixed 85 parts of Component "A" with 32.4 parts Component "B" and obtained a composition which is easily brushed, rolled or sprayed onto a surface. A steel test panel bearing a 10 mil coating (dry film thickness) of this composition over a coal tarepoxy primer coating showed substantially no fouling after 1 ½ years exposure to sea water at Miami Beach, Fla.

EXAMPLE V

I prepared Component "A" the same as described in Example I. I prepared the following mixtures to serve as the solution form of Component "B" of my composition:

| | | Parts |
|---|---|---|
| (a) | Tributyltin acetate | 46 |
| | Diethylenetriamine | 8 |
| | Pyridine | 46 |
| (b) | Tributyltin acetate | 46 |
| | Diethylenetriamine | 8 |
| | O-Dichlorobenzene | 46 |
| (c) | Tributyltin acetate | 46 |
| | Diethylenetriamine | 8 |
| | Methanol-o-dichlorobenzene (1:1 by volume) | 46 |
| (d) | Tributyltin acetate | 46 |
| | Diethylenetriamine | 8 |
| | Trichloroethylene | 46 |
| (e) | Tributyltin acetate | 45 |
| | Diethylenetriamine | 10 |
| | Methanol | 45 |
| (f) | Tributyltin acetate | 45 |
| | Diethylenetriamine | 10 |
| | Pyridine | 45 |
| (g) | Tributyltin acetate | 45 |
| | Diethylenetriamine | 10 |
| | O-Dichlorobenzene | 45 |
| (h) | Tributyltin acetate | 45 |
| | Diethylenetriamine | 10 |
| | Trichloroethylene | 45 |
| (i) | Tributyltin acetate | 45 |
| | Diethylenetriamine | 10 |
| | Methanol-o-cresol (1:1 by weight) | 45 |
| (j) | Tributyltin acetate | 19 |
| | Diethylene triamine | 5 |
| | Methanol | 19 |
| | Talc | 57 |

I then combined the "A" and the different "B" components according to the following table:

| Component "A" | Component "B" |
|---|---|
| 85 parts from Ex. I | 32.4 parts from Ex. V (a) |
| 85 parts from Ex. I | 32.4 parts from Ex. V (b) |
| 85 parts from Ex. I | 32.4 parts from Ex. V (c) |
| 85 parts from Ex. I | 32.4 parts from Ex. V (d) |
| 90 parts from Ex. I | 22.5 parts from Ex. V (e) |
| 90 parts from Ex. I | 22.5 parts from Ex. V (f) |
| 90 parts from Ex. I | 22.5 parts from Ex. V (g) |
| 90 parts from Ex. I | 22.5 parts from Ex. V (h) |
| 90 parts from Ex. I | 22.5 parts from Ex. V (i) |
| 85 parts from Ex. I | 79 parts from Ex. V (j) |

Each composition produced a well-cured coating film and gave good antifoulant protection to a test panel.

EXAMPLE VI

The following are examples of Component "A" prepared using synthetic thermoplastic hydrocarbon resins instead of the coal tar of Example I in which all quantities are in parts by weight:

| | | Parts |
|---|---|---|
| (a) | Coumarone-indene resin (softening point 75C) | 30 |
| | Epoxy Resin ("Epon 834") | 30 |
| | Talc | 20 |
| | Ethylene glycol monoethyl ether | 20 |
| (b) | Terpene phenolic resin (softening point 100C) | 30 |
| | Epoxy Resin ("Epon 834") | 30 |
| | Talc | 20 |
| | Xylene | 20 |
| (c) | Alpha-methylstyrene-vinyltoluene copolymers (softening point 100C) | 30 |
| | Epoxy Resin ("Epon 834") | 30 |
| | Talc | 20 |
| | Xylene | 20 |
| (d) | Alkyl aromatic polyindene hydrocarbon resin (softening point 75C) | 30 |
| | Epoxy Resin ("Epon 834") | 30 |
| | Talc | 20 |
| | Xylene | 20 |
| (e) | Styrene, acrylonitrile, indene terpolymer (softening point 100C) | 30 |
| | Epoxy Resin ("Epon 834") | 30 |
| | Talc | 20 |
| | Xylene | 20 |
| (f) | Low molecular weight polystyrene (softening point 75C) | |
| | Epoxy Resin ("Epon 834") | 30 |
| | Talc | 20 |
| | Xylene | 20 |

I prepared the following mixture to serve as Component "B" of my composition:

| | | |
|---|---|---|
| (a) | Tributyltin acetate | 46 |
| | Diethylene triamine | 8 |
| | Methanol | 23 |
| | Mineral Spirits | 23 |

I then combined 85 parts by weight of the different "A" components with 32.4 parts by weight of the "B" component. Each composition produced a well-cured coating film. The substitution of a portion of the talc from the "A" components with pigments gave attractively colored antifoulant coatings.

I claim:

1. A method of preparing an antifoulant coating composition comprising mixing, just prior to applying the composition to a substrate, a Component "A" and a Component "B", wherein:

the active ingredient of Component "A" is a base formed of epoxy resin and a substance selected from the group which consists of aromatic pitch-containing materials and thermoplastic hydrocarbon resins in proportions of about 5 to 95 parts by weight of epoxy resin to about 95 to 5 parts by weight of said substance; and the active ingredients of Component "B" are a curing agent for the epoxy resin of said base and a solid organotin toxicant in proportions of about 1 to 10 parts by weight of toxicant for each part by weight of curing agent;

said curing agent being a nitrogen-containing compound of the group which consists of polyamines and polyamides; said toxicant being of the general formula $$(R\ R'\ R''\ Sn)\ n\ X$$

in which R, R', R'' are alkyl groups of one to eight carbon atoms, X is a carboxylate group, and $n$ is 1 or 2;

the resulting mixture containing as active ingredients about 90 to 60 percent by weight of cured base and about 10 to 40 percent by weight of toxicant, of which at least a portion is in the form of needle-like crystals.

2. A method as defined in claim 1 in which the composition contains a solvent and an inert filler in an amount up to about 50 percent by weight of the composition, at least a portion of said filler being introduced via Component "A".

3. A method as defined in claim 2 in which said filler is introduced to the mixture in part via Component "B".

4. A method as defined in claim 1 in which Component "B" also contains a diluent in an amount up to about equal parts by weight of diluent and toxicant.

5. A method as defined in claim 4 in which the diluent is a substance in which the toxicant is only sparingly soluble, and Component "B" is in the form of a slurry of needle-like crystals of toxicant.

6. A method as defined in claim 4 in which the diluent is a solvent for the toxicant, and Component "B" is in the form of a solution.

7. A method as defined in claim 1 in which the toxicant is tributyltin acetate.

8. An antifoulant coating composition composed of a mixture of a Component "A" and a Component "B", wherein:

the active ingredient of Component "A" is a base formed of epoxy resin and a substance selected from the group which consists of aromatic pitch-containing materials and thermoplastic hydrocarbon resins in proportions of about 5 to 95 parts by weight of epoxy resin to about 95 to 5 parts by weight of said substance; and the active ingredients of Component "B" are a curing agent for the epoxy resin of said base and a solid organotin toxicant in proportions of about 1 to 10 parts by weight of toxicant for each part by weight of curing agent;

said curing agent being a nitrogen-containing compound of the group which consists of polyamines and polyamides; said toxicant being of the general formula $$(R\ R'\ R''\ Sn)\ n\ X$$

in which R, R', R'' are alkyl groups of one to eight carbon atoms, X is a carboxylate group, and $n$ is 1 or 2;

said mixture containing as active ingredients about 90 to 60 percent by weight of cured base and about 40 to 10 percent by weight of toxicant of which at least a portion is in the form of needle-like crystals.

9. A composition as defined in claim 8 containing a solvent and an inert filler in an amount up to about 50 percent by weight of the composition.

10. A composition as defined in claim 8 in which Component "B" also contains a diluent in an amount up to about equal parts by weight of diluent and toxicant.

11. A composition as defined in claim 10 in which the diluent is a substance in which the toxicant is only sparingly soluble, and Component "B" is in the form of a slurry of needle-like crystals.

12. A composition as defined in claim 10 in which the diluent is a solvent for the toxicant, and Component "B" is in the form of a solution, said toxicant precipitating as needle-like crystals when Components "A" and "B" are mixed.

13. A composition as defined in claim 8 in which the toxicant is tribytytin acetate.

14. A composition as defined in claim 8 to which is added a thinner to provide a sprayable consistency, said thinner having low solvency for the toxicant.

* * * * *